United States Patent
Woody, Jr. et al.

(10) Patent No.: US 6,924,834 B2
(45) Date of Patent: Aug. 2, 2005

(54) ANALOG OR SERIAL DIGITAL VIDEO INPUT WITH AUTOMATIC VIDEO SWITCH

(75) Inventors: David C. Woody, Jr., Tigard, OR (US); Scott E. Zink, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 562 days.

(21) Appl. No.: 10/124,015

(22) Filed: Apr. 16, 2002

(65) Prior Publication Data

US 2003/0197783 A1 Oct. 23, 2003

(51) Int. Cl.$^7$ ............................................. H04N 17/00
(52) U.S. Cl. ..................................... 348/180; 348/192
(58) Field of Search .................................. 348/180, 184, 348/192, 193, 181, 705, 706; 702/57, 66, 67, 69–71, 73, 74; 324/76.12

(56) References Cited

U.S. PATENT DOCUMENTS

| | | | |
|---|---|---|---|
| 4,554,636 A | * 11/1985 | Maggi et al. | 702/118 |
| 5,289,281 A | * 2/1994 | Perry et al. | 348/571 |
| 5,614,944 A | * 3/1997 | Taura et al. | 348/183 |
| 6,369,857 B1 | 4/2002 | Balaban et al. | |
| 6,490,001 B1 | 12/2002 | Shintani et al. | |
| 2001/0033625 A1 | 10/2001 | Ninomiya et al. | |
| 2003/0035065 A1 | 2/2003 | Kim | |

FOREIGN PATENT DOCUMENTS

| | | |
|---|---|---|
| EP | 1 134 989 A | 9/2001 |
| EP | 1 280 275 A | 1/2003 |
| GB | 2 338 854 A | 12/1999 |
| WO | WO 00 62535 A | 10/2000 |
| WO | WO 01 06775 A | 1/2001 |

* cited by examiner

Primary Examiner—Victor R. Kostak
(74) Attorney, Agent, or Firm—Francis I. Gray

(57) ABSTRACT

An instrument has a single video input port for receiving either analog or serial digital video signals coupled to both an analog and a serial digital video input path. The outputs of the analog and serial digital video input paths are provided as respective inputs to a video switch, the output of which is then provided to the instrument for further processing. Information from the serial digital video input path, which may include clock recovery lock, carrier detect and/or video standard, is provided to a decision module that generates a select signal for the video switch. As an example, if "lock" is present, then the output from the serial digital video input path is selected automatically for output by the video switch, otherwise the output from the analog video input path is selected automatically. The automatic selection for the switch may be manually overridden. A text display is provided to indicate which video input path the instrument is processing according to the output from the video switch, as well as information about the video signal at the video input port.

11 Claims, 1 Drawing Sheet

ANALOG OR SERIAL DIGITAL VIDEO INPUT WITH AUTOMATIC VIDEO SWITCH

BACKGROUND OF THE INVENTION

The present invention relates to video test and measurement instruments, and more particularly to a video test and measurement instrument having a single input for receiving either an analog or a serial digital video signal with the ability to automatically switch internal processing accordingly.

In the current transitional stage from analog to digital video environments, many video studios operate in a mixed environment—having both analog and serial digital video sources available. In order to observe the quality of the video signal from these sources, a user has to know which type of source is being tested/measured in order to use an appropriate instrument. This in the past has required the user to have at least two instruments with him—one for analog video and one for digital video. Alternatively the user has a single instrument with a converter to convert from the type of signal of the source to the type of signal acceptable by the instrument. Currently there are waveform monitors available for both analog and digital video signals. But these instruments have separate analog and digital video input ports. Even with these instruments the user has to know what type of source he is measuring in order to connect it to the proper video input port. For a handheld instrument with limited real estate, having two different video input ports is not practical.

What is desired is the ability to have a single video input port for an instrument that accepts either analog or serial digital video signals with an automatic video switch between analog and digital video input paths within the instrument.

BRIEF SUMMARY OF THE INVENTION

Accordingly the present invention provides an instrument having a single video input port for analog or serial digital video signals with an automatic video switch within the instrument between an analog and a serial digital video input path. The outputs of the analog and serial digital video input paths are provided as respective inputs to a video switch, the output of which is then provided to the instrument for further processing. Information from the serial digital video input path, which may include clock recovery lock, carrier detect and/or video standard, is provided to a decision module that generates a select signal for the video switch. As an example, if "lock" is present, then the output from the serial digital video input path is selected for output by the video switch, otherwise the output from the analog video input path is selected. The automatic selection for the switch may be manually overridden. A text display is provided to indicate which video input path the instrument is processing according to the output from the video switch, as well as information about the video signal at the video input port.

The objects, advantages and other novel features of the present invention are apparent from the following detailed description when read in conjunction with the appended claims and attached drawing.

DETAILED DESCRIPTION OF THE INVENTION

Figure 1:
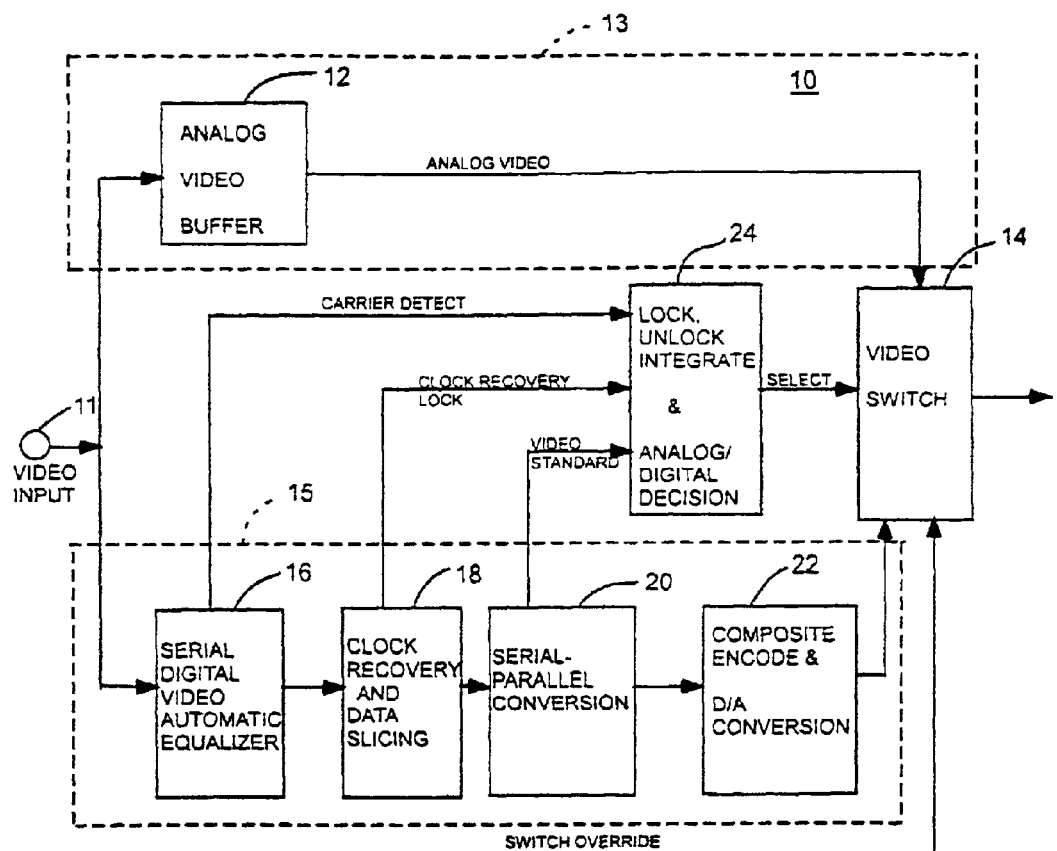
FIG. 1 is a block diagram view of an input section of a video test and measurement instrument according to the present invention.

Referring now to FIG. 1 a video signal, either analog or serial digital format, is received at a video input port 11 of a video test and measurement instrument 10 and routed to both analog and digital video input paths 13, 15. The analog video input path 13 may include an analog video buffer 12 that receives the video signal and routes it as an analog video signal to a video switch 14. The digital video input path 15 has a conventional digital video receiver that may include an automatic equalizer 16, a clock recovery and data slicing module 18, a serial to parallel converter 20 and a composite encoder 22 in series to process the input video signal, the output of which is a digital video signal for input to the video switch 14. The output of the digital receiver may be converted to analog by a digital to analog converter as part of the encoder 22 prior to input to the video switch 14, or alternatively the output of the analog video buffer 12 may be converted to digital by an analog to digital converter prior to input to the video switch so that both inputs to the video switch are in the same video format. Which video input path 13, 15 is converted to the other video format is a function of the processing hardware in the instrument at the output of the video switch 14.

A decision module 24 may receive a carrier detect signal from the equalizer 16, a clock recovery lock signal from the clock recovery module 18 and/or a video standard signal from the converter 20. From these information signals the decision module 24 automatically determines whether the video signal is analog or serial digital and provides a select signal to the video switch 14 accordingly. The output from the video switch 14 is the video signal from the video input path 13, 15 selected by the decision module 24 for further processing by the instrument. Also input to the switch 14 is a manual switch override control signal that overrides the output from the decision module 24 if desired by a user.

The serial digital video receiver 16–22 may be contained within a standard serial digital video receiver chip set that provides the information signals to the decision module 24 indicated above. The decision module 24 determines whether a serial digital video signal is present at the video input. If there is, the output from the serial digital video receiver is output by the video switch 14, otherwise the output from the video switch is from the analog video buffer 12. As an example, if a phase locked loop (PLL) in the serial digital video receiver chip set reports a video lock, then a variable lock is set to "1", otherwise it is "0". The following routine may be used to filter some glitches out of lock.

```
if (lock)
{
    if (countSdVideoLock < INTEGRATION_COUNT)
    {
        countSdVideoLock++;
        if (countSdVideoLock >= INTEGRATION_COUNT)
        {
            detSdVideoStd = SdStd_Unknown;
            // digital video is locked, but the standard is not yet known //
        }
    }
}
else
{
    if (countSdVideoLock > 0)
        CountSdVideoLock-;
    if (countSdVideoLock == 0)
        detSdVideoStd = SdStd_Unlocked
    // digital video is unlocked //
}
```

If the variable detSdVideoStd equals the constant SdStd_Unlocked, the analog signal is selected, otherwise the digital signal is selected unless the selection is overridden.

The switch override or INPUT_CTL signal to the video switch 14 may have three settings—AUTO (input auto detected), DIGITAL (input assumed to always be digital) and ANALOG (input always assumed to be analog). A text indicator on a screen of the instrument associated with video type depends on the INPUT_CTL setting and other conditions, as set forth in the following table:

| SETTINGS | CONDITIONS | TEXT DISPLAYED |
|---|---|---|
| INPUT_CTL = AUTO | Digital video lock | DIGITAL |
| | No digital video lock | ANALOG |
| | Digital video lock to unsupported standard | Name of video standard |
| INPUT_CTL = DIGITAL | Digital video lock | DIGITAL |
| | No digital video lock | UNLOCKED |
| | Digital video lock to unsupported standard | Name of video standard |
| INPUT_CTL = ANALOG | Any | No display |

Although the above description used only the Lock signal in the decision module 24, the Carrier Detect signal also may be used, either alone or as a qualifier for the Lock signal. In this case the decision may be based as follows: "If Carrier Detect is true, then go to digital"; or "If Carrier Detect is true and Lock is true, then go to digital." The Carrier Detect signal is less discriminating than the Lock signal since it responds to any large signal in the range of 100 to 500 MHz, even if it is just noise. A more discriminating decision than one based on the Lock signal only is one where the Video Standard signal is used. If the Video Standard signal is one that is recognized and/or used by the instrument, then it may be used to qualify the Lock signal to make the determination as to whether the video signal at the video input port is digital or analog.

Thus the present invention provides a video test and measurement instrument having a single video input port to which the inputs of both an analog and a digital video input path are coupled, the output of each video input path being input to a video switch, and having a decision module that receives information from the digital video input path to whether a video signal at the video input port is analog or digital, the video input path that is switched to the output of the video switch being a function of the information (automatic) and a switch override control signal.

What is claimed is:

1. A video test and measurement instrument comprising:
   means for coupling a common video input port to an input of an analog video input path and an input of a digital video input path, each video input path having a separate output;
   means for automatically switching between the separate outputs in response to information derived from the digital video input to provide an output video signal corresponding to the video format of a video signal applied to the common video input port.

2. The instrument as recited in claim 1 wherein the automatically switching means comprises:
   a video switch having respective inputs coupled one to each of the separate outputs, having a select input and having an output to provide the output video signal; and
   a decision module for generating a select signal as a function of the information, the select signal being applied to the select input in order to switch the output between the separate outputs according to the video format of the video signal.

3. A method of automatically switching between analog and digital video input paths in a video test and measurement instrument comprising the steps of:
   coupling an input of the analog video input path to a video input port;
   coupling an input of the digital video input path to the video input port;
   coupling inputs of a video switch to respective outputs of the analog and digital video input paths; and
   generating a select signal for the video switch as a function of information derived from the digital video input path to select which video input path is coupled to an output of the video switch for further processing by the video test and measurement instrument.

4. The method as recited in claim 3 further comprising the step of providing a text message on a display of the video test and measurement instrument indicative of which video input path is selected for output by the video switch.

5. The method as recited in claim 4 wherein the test message includes information about a video signal coupled to the video input port.

6. An apparatus for processing a video signal applied to an input port of a test and measurement instrument comprising:
   an analog buffer having an input coupled to the input port and having an output to form an analog video input path;
   a digital video receiver having an input coupled to the input port and having an output to form a digital video input path;
   a video switch having inputs coupled to the respective outputs of the analog and digital video input paths; and
   a decision module having as inputs information from the digital video receiver and having an output coupled to a select input of the video switch, the decision module generating a select signal at its output as a function of the information to select which video input path output is provided at the output of the video switch.

7. The apparatus as recited in claim 6 wherein the information includes one or more of a lock signal, a carrier detect signal and a video standard signal.

8. The apparatus as recited in claim 7 wherein the decision module generates the select signal as a function of the lock signal.

9. The apparatus as recited in claim 7 wherein the decision module generates the select signal as a function of the carrier detect signal.

10. The apparatus as recited in claim 7 wherein the decision module generates the select signal as a function of the lock and carrier detect signals.

11. The apparatus as recited in claim 7 wherein the decision module generates the select signal as a function of the video standard and lock signals.

* * * * *